United States Patent
Bramstedt et al.

[19]

[11] Patent Number: 5,863,005
[45] Date of Patent: Jan. 26, 1999

[54] FORAGE HARVESTER INCLUDING SELECTIVELY OPERABLE CROP PROCESSING AND CONVEYOR ARRANGEMENTS

[75] Inventors: Gerd Bramstedt; Peter Lipiceanu, both of Zweibrucken, Germany

[73] Assignee: Deere & Company, Moline, Ill.

[21] Appl. No.: 789,728

[22] Filed: Jan. 27, 1997

[30] Foreign Application Priority Data

Feb. 3, 1996 [DE] Germany .................. 196 03 928.2

[51] Int. Cl.[6] .................................................. B02C 21/02
[52] U.S. Cl. ............................. 241/101.742; 241/186.3
[58] Field of Search .................... 241/101.742, 186.3, 241/222; 56/13.3, 13.4, 14.3

[56] References Cited

U.S. PATENT DOCUMENTS

| | | | |
|---|---|---|---|
| 4,223,846 | 9/1980 | Priepke et al. | 241/60 |
| 4,678,129 | 7/1987 | Dallinger | 241/101.7 |
| 4,696,432 | 9/1987 | Russ et al. | 241/101.7 |
| 4,767,067 | 8/1988 | Bruer et al. | 241/81 |
| 5,558,282 | 9/1996 | Ameye et al. | 241/60 |

FOREIGN PATENT DOCUMENTS

| | | |
|---|---|---|
| 0 242 718 A1 | 4/1987 | European Pat. Off. . |
| 0 492 273 A2 | 7/1992 | European Pat. Off. . |
| 253107 | 3/1984 | France . |
| 2539950 | 4/1984 | France . |
| 2692430 | 12/1993 | France . |
| 35 35 620 A1 | 4/1987 | Germany . |
| 37 27 156 A1 | 2/1989 | Germany . |
| 44 06 304 A1 | 9/1995 | Germany . |

OTHER PUBLICATIONS

Claas Vertriebsgesellschaft mbH, Brochure entitled "Jaguar 880, 860, 840, 820", three pages, dated Aug. 95, published in Germany.

*Primary Examiner*—John M. Huser

[57] ABSTRACT

A forage harvester includes a crop processing arrangement as well as a conveyor arrangement which can be selectively positioned in respective operating positions in a cutout in the duct extending between the crop chopping assembly and the blower for discharging chopped crop into a trailing container. The conveyor arrangement can be attached to the underside of the crop processing arrangement for the sake of this installation.

10 Claims, 4 Drawing Sheets

FORAGE HARVESTER INCLUDING SELECTIVELY OPERABLE CROP PROCESSING AND CONVEYOR ARRANGEMENTS

BACKGROUND OF THE INVENTION

The present invention relates to a forage harvester having a chopper assembly and a delivery arrangement that are connected to each other by a channel that is provided with a cutout into which a crop processing arrangement or a conveyor arrangement can be selectively inserted.

A Claas Company advertising brochure, bearing the designation 8/95 (M+E) dt. 150/190.432.7, discloses a forage harvester equipped with a chopper assembly including a chopper drum that chops crop such as corn, grass, sorghum and the like and directs it through a channel to a blower that delivers the chopped crop to a delivery arrangement from where it flows to an accompanying vehicle. In addition to the blower, the channel contains a crop processing arrangement that consists of two rolls that rotate in opposite directions about parallel, with the crop being fed between and crushed by the rolls. The crop processing arrangement consists of a single unit or module and as such can selectively be either installed or removed by sliding the unit horizontally through a cutout in the channel, installation usually being done when corn or sorghum is being harvested and removal usually being done when grass is being harvested for silage.

U.S. Pat. No. 4,678,129, granted to Dallinger on 7 Jul., 1987 also discloses a crop processing arrangement with two rolls rotating in opposite directions that are installed in a channel. Here the lower roll can be pivoted out of the channel on pivot arms and replaced by a roll carrying paddles. The roll with paddles interacts with the remaining roll that carries teeth on its outer surface in order to convey the crop to a blower. In this way jamming should be avoided when the crop processing arrangement is employed in the grass harvest. A comparable solution is also provided according to FR-B1-25 39 950, published 3 Aug. 1984.

According to U.S. Pat. No. 4,696,432, granted to Russ et al. on 29 Sep. 1987, either a crop processing arrangement or a conveyor arrangement can be selectively installed in the channel between the chopper assembly and the delivery arrangement. However, in each case, the channel is specifically configured to accommodate the particular arrangement used and accordingly, a single channel configuration is not compatible with both arrangements.

The problem underlying the invention is seen in the fact that the fine and sharp-edged teeth on the circumferential surface of the rolls employed for the processing do not have a sufficiently non-skid surface for the conveying of grass and become dull under constant operation on grass. On the other hand, removal of the crop processing arrangement can lead to the condition that the crop is not accelerated sufficiently.

SUMMARY OF THE INVENTION

According to the present invention, there is provided a forage harvester having improved duct, crop processing and crop conveying arrangements located between the crop chopper and blower.

A broad object of the invention is to provide a forage harvester having a duct arrangement extending between a crop chopper and blower which contains a cutout into which may be selectively inserted either a crop processing arrangement or a crop conveying arrangement.

A more specific object of the invention is to provide a forage harvester, as defined in the previous object, wherein the crop processing and crop conveying arrangements are selectively driven by the same drive arrangement.

Yet another object of the invention is to provide a forage harvester, as defined above, wherein the crop processing and crop conveying arrangements are releasably secured together and movable as a unit, within the cutout of the duct arrangement, between a first position disposing the crop processing arrangement in an operative position and a second position disposing the crop conveying arrangement in an operative position.

Still another object of the invention is to provide a forage harvester, as defined in the immediately preceding object, wherein the crop processing arrangement is mounted for moving vertically along a pair of support rails, whereby the crop conveying arrangements moves together with the crop processing arrangement.

These and other objects will become apparent from a reading of the ensuing description together with the appended drawings.

DESCRIPTION OF THE PREFERRED EMBODIMENT

Figure 1:
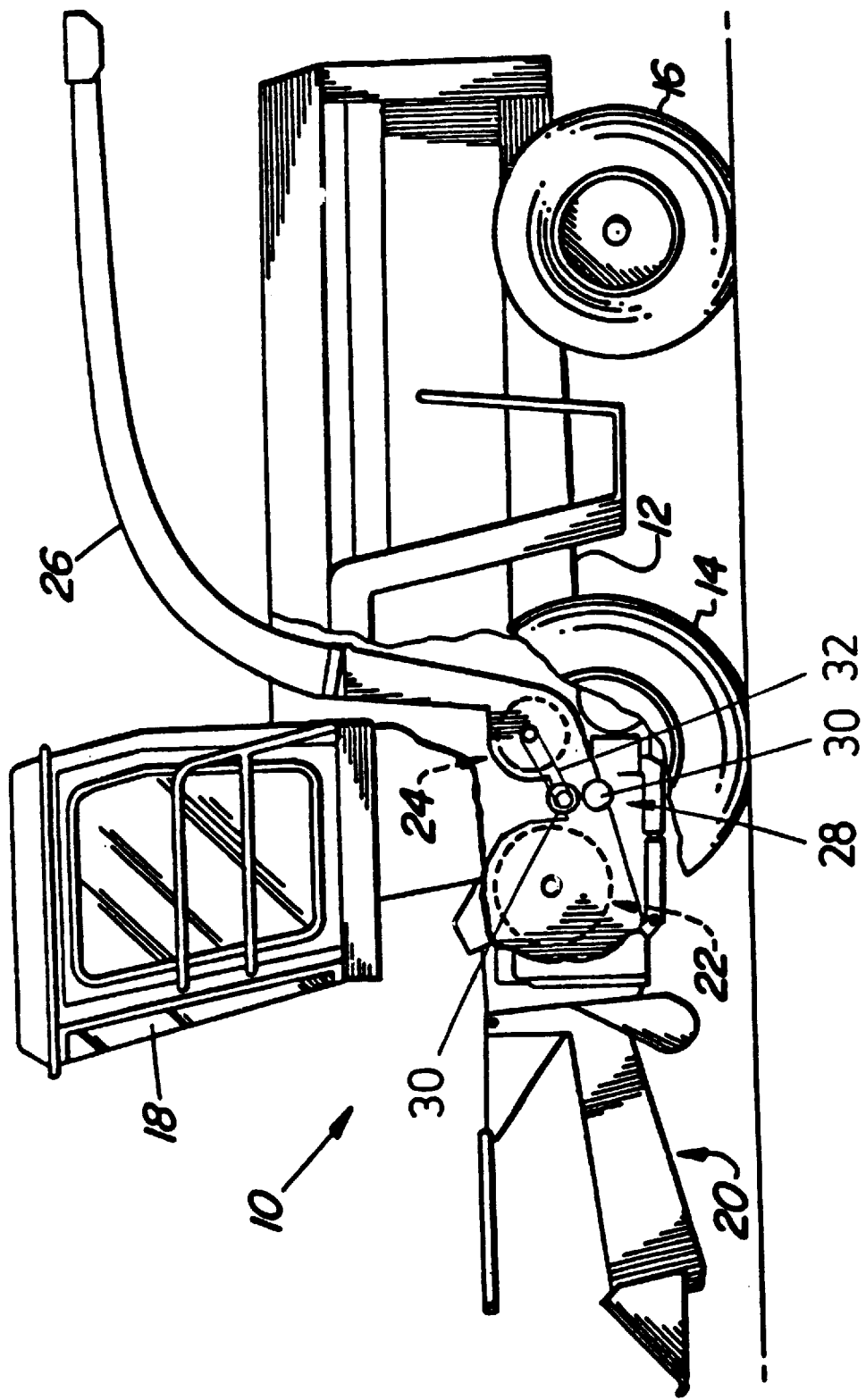
FIG. 1 shows a schematic side view of a forage harvester.

Referring now to FIG. 1, there is shown a self-propelled forage harvester 10 including a main frame 12 that is supported on front and rear pairs of wheels 14 and 16. The forage harvester 10 is operated from an operator's cab 18 from where a crop pickup arrangement 20 can be observed visually. Crop, for example, corn, grass or the like, gathered up from the ground by the crop pickup arrangement 20 is conducted to a chopper assembly 22 which chops it into small pieces and transfers it to a conveyor or blower 24. The crop leaves the forage harvester 10 through a pivoted delivery arrangement or discharge spout 26 to an accompanying trailer. Located between the chopper assembly 22 and the blower 24 is a crop processing arrangement 28, principally used when harvesting corn, that transfers the crop to the blower 24. Further details of the forage harvester 10 do not require any description since this is known in itself. The position of the crop processing arrangement 28, is not critical and it could be provided downstream of the blower 24 as well.

Figure 2:
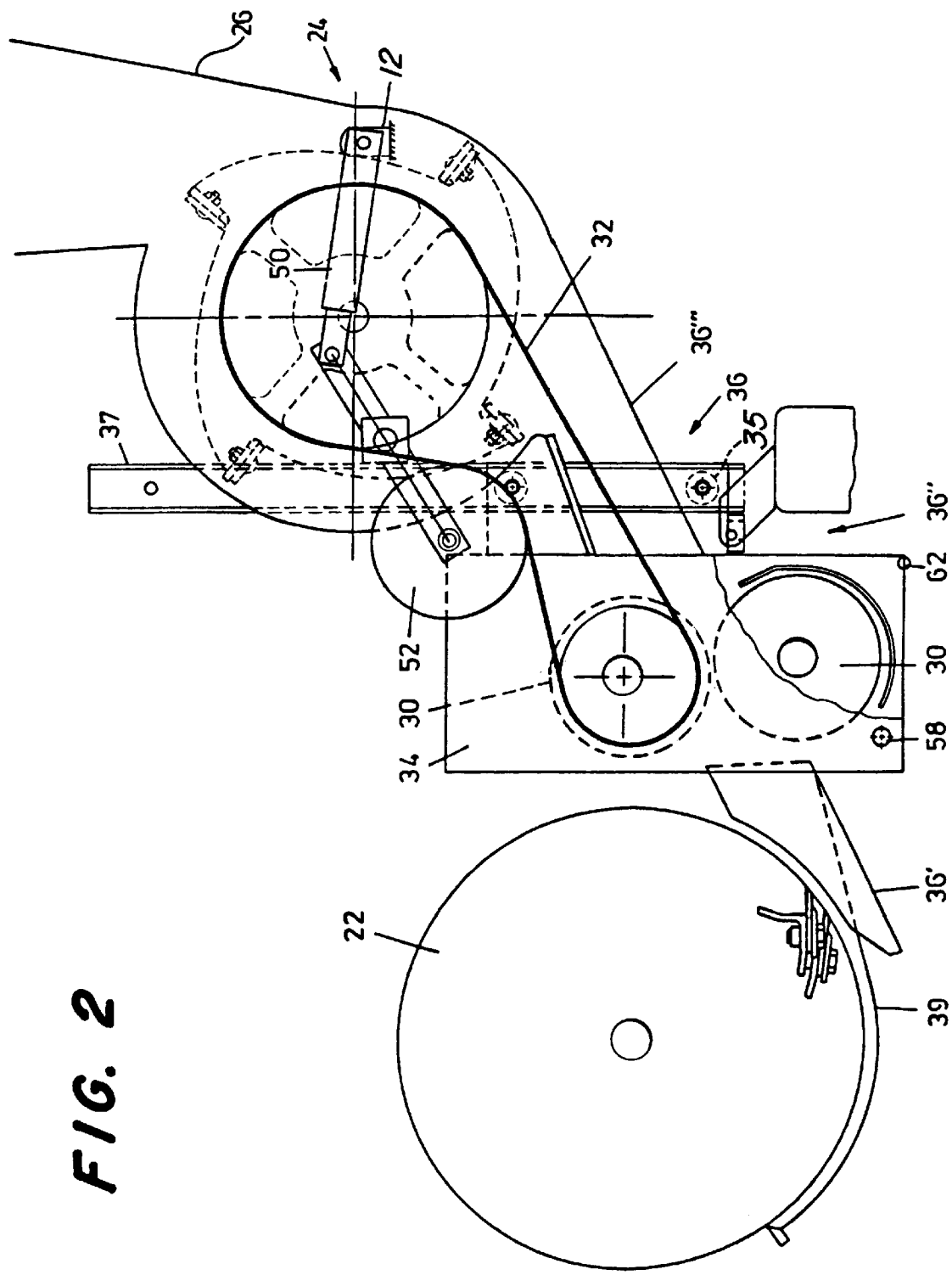
FIG. 2 shows a schematic side view a chopper assembly, a delivery arrangement and a crop processing arrangement located in a channel extending between the chopper assembly and delivery arrangement, with a left side wall being removed.
Figure 3:
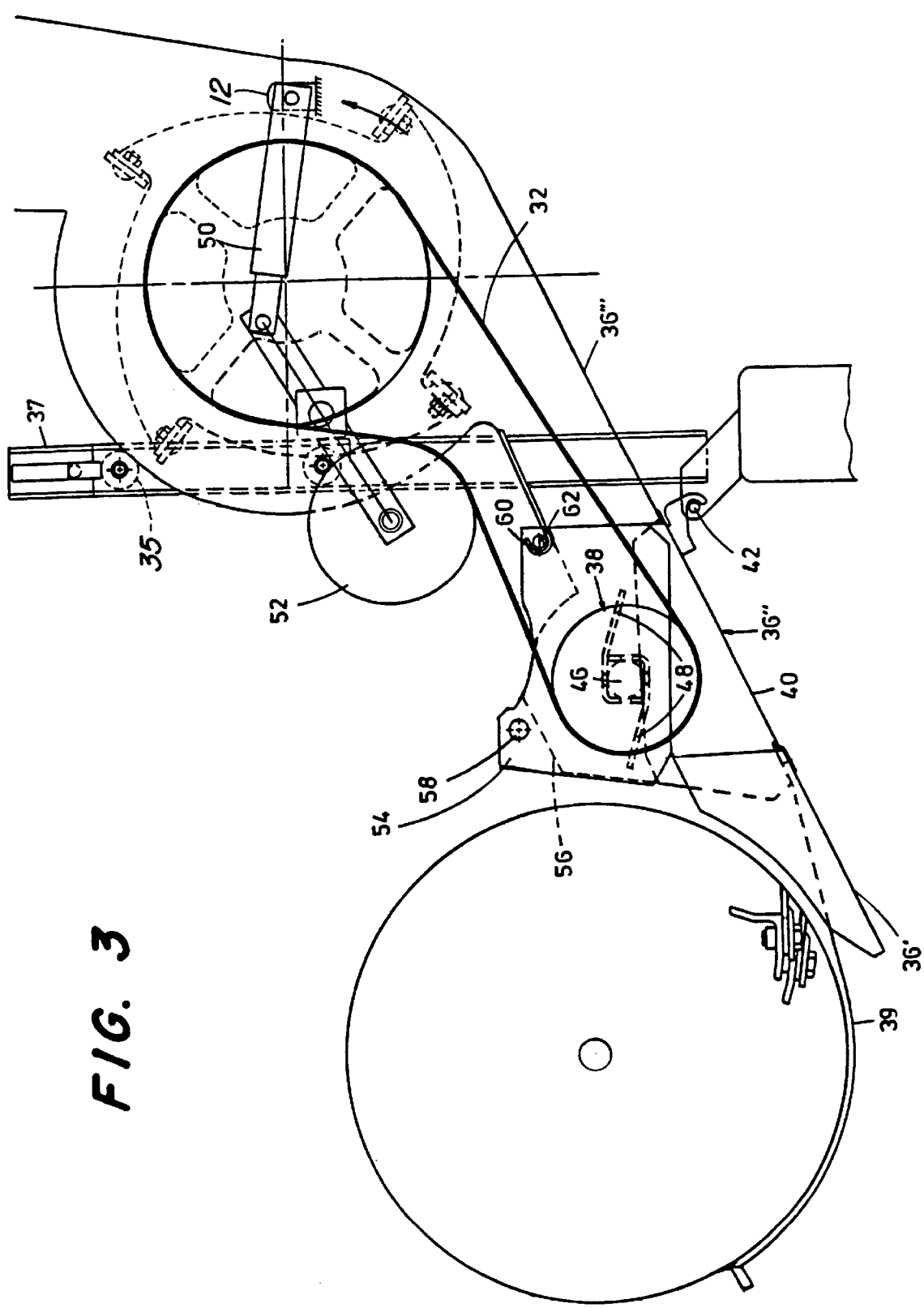
FIG. 3 is a view like FIG. 2, but with a conveyor arrangement in place of the crop processing arrangement.
Figure 4:
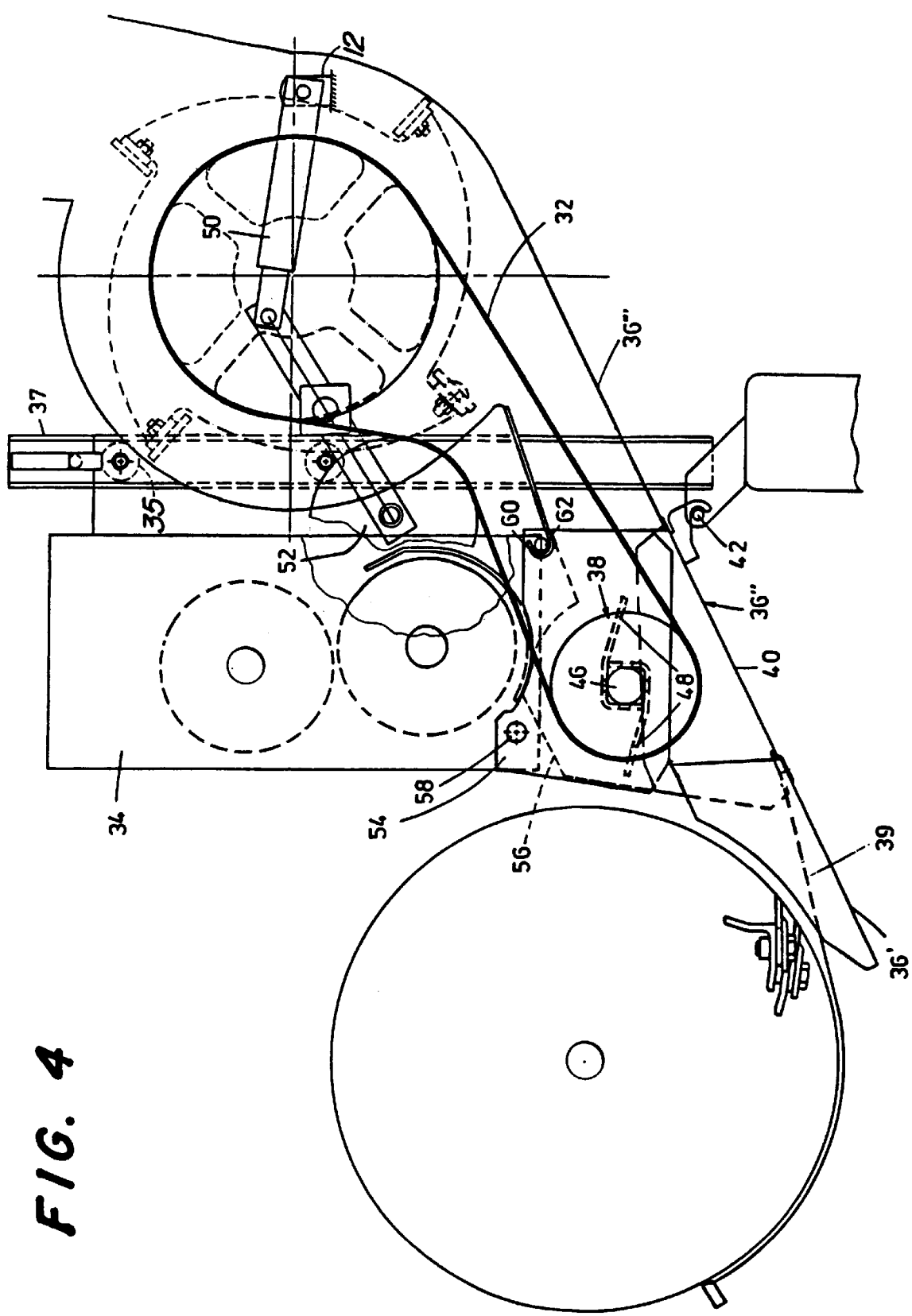
FIG. 4 is a view like FIG. 2, but showing a combined crop processing arrangement and conveyor arrangement, with the former being shown in a stored position and the latter being shown in a working position.

According to FIGS. 1, 2 and 4, the crop processing arrangement 28 includes two rolls 30 arranged in pairs and having their outer surfaces provided with sharp-edged profiles, as is well known. Both rolls 30 are normally driven at rotational speeds that differ only slightly. A drive belt or chain 32, forming part of a drive arrangement, extends from a pulley or sprocket on a shaft of the upper roll 30, to a pulley or sprocket on a shaft of the blower 24. A second drive belt or chain, not shown, extends in an S-shaped path about pulleys or sprockets, also not shown, on the shafts of the rolls 30. As viewed in the drawings, the blower 24 and the upper roll 30 rotate in the counterclockwise direction and in this way convey the crop, delivered by the chopper assembly 22, out of the forage harvester 10 by way of the discharge spout 26. The rolls 30 are arranged one above the other and are supported for rotating freely by bearings, not shown, provided in a housing 34. The housing 34 penetrates a duct or channel 36 that extends from the chopper assembly 22 to the blower 24 or to the discharge spout 26 and is closed on four sides in order to conduct the crop after it has been chopped. The crop processing arrangement 28 is configured as a single component or module, with opposite sides of its housing 34 each having a pair of vertically spaced, bearing-containing rollers 35 mounted thereto and received for being adjusted vertically in a guide track formed by a rail 37, as is known from John Deere forage harvester Models 6610-6910, and can thereby be brought into an operating position, as shown in FIGS. 1 and 2, in particular by a pull rope or cable, or into a stored or rest position, principally when harvesting grass, as shown in FIG. 4. The rails 37 are rigidly fastened to the sides of the duct 36. The duct 36 is here shown subdivided into three sections, specifically, a forward, a central and a rear section 36', 36" and 36''', respectively. The forward section 36' is rigidly or movably attached to the chopper assembly 22 and represents generally a continuation of surrounding walls of the assembly 22. A guide vane 39 extends through the forward section 36' and up to the forward side of the housing 34, in order to guide the crop optimally. The central section 36" can selectively be formed by an inserted sheet metal housing, not shown, carried by the crop processing arrangement 28 or by a conveyor arrangement 38 (FIGS. 3 and 4). Depending on the configuration of the central section 36", the underside of the duct 36 in this region can be closed by a flap 40 which can be attached through a joint 42 to the rear section 36''' or to the frame 12 so as to pivot vertically and close the duct 36 from below when in an upper position, as can be seen in FIGS. 3 and 4. The rear section 36''' is connected directly to a duct of the delivery arrangement 26 and blends into its wall without any steps. The sections 36' and 36''' may contain individual sheet metal parts that can be slid and can be applied to the conveyor arrangement 38 or the crop processing arrangement 28 for their installation or removal in order to close any gap that may exist. In addition, these sections 36' and 36''' may be provided with flanges on their end faces that face the section 36" which extend in the direction in which the conveyor or crop processing arrangement 38 or 28 are slid into place and that permit another mode of attachment or sealing. Such configurations of the sections 36' and 36''' are particularly appropriate if provision is also made for the insertion of only a sheet metal housing in the cutout of the central section 36" in place of the conveyor arrangement 38 or the crop processing arrangement 28.

As seen in FIG. 3, the conveyor arrangement 38 in this embodiment is composed of a horizontal shaft 46 that extends transversely to the direction of crop flow. Mounted to and extending along the shaft 46 are a pair of diametrically opposite dogs 48. The dogs 48 are each formed from a sheet metal angle whose angle-forming region envelops and is fastened to the shaft 46 and whose longer leg defines a paddle which is bent, at a location just beyond the shaft, slightly opposite to the direction of rotation of the shaft 46. The radially outer end regions of the dogs 48 nearly touch the bottom of the duct 36, in this case the surface of the flap 40, during rotation of the shaft 46. Instead of the paddle-shaped configuration, the dogs 48 may also be formed of elastic or rigid tines, or flails or the like.

FIG. 3 also includes the flexible drive member 32 where its path clearly shows that the conveyor arrangement 38 is an undershot conveyor. The drive member 32 is brought into contact with each of the pulleys or sprockets, not shown, with sufficient force by means of a tensioning pulley or sprocket 52 actuated by a hydraulic motor 50. The conveyor arrangement 38 includes side walls 54 with bearings, not shown, that support the shaft 46 for rotating freely, and a sheet metal cover 56 which interconnects the side walls 54. The cover 56 includes a forward portion which follows part of the circumference of the cylindrical path swept by the dogs 48 and a rear portion which extends in the direction of the rear section 36'''. However, the conveyor arrangement 38 can also be configured and driven in such a way that it operates as an overshot conveyor. In this case the drive belt or chain 32 would have to follow an S-shaped path, a reverse drive would have to be provided or, in the case of the element 32 being a belt, it could be a six-sided belt used together with an idler sprocket located such the side opposite from that engaged with the idler would be engaged for driving the pulley mounted to the drive shaft 46.

In place of the flap 40, the bottom region of the duct 36 in the section 36' can also be closed by the provision of a connecting piece or a bottom sheet joined to the side walls 54. In this case, the side walls 54, the sheet metal cover 56 and the possible connecting piece or bottom sheet would have to follow the cross section of the duct 36 at its inlet and outlet. In the case where the conveyor arrangement 38 operates as an overshot conveyor, the flap 40 as well as the connecting piece or bottom sheet could possibly be omitted.

In each of the forward upper corner regions of the side walls 54 of the conveyor arrangement 38, a bore 58 is provided which can be brought into alignment with a corresponding covered bore in the housing 34 of the crop processing arrangement 28 where both bores 58 are suitable for and intended for engaging pins, not shown, for the connection of the side walls 54 to the housing 34 (FIG. 4). Between the rear upper corner regions of the side walls 54 there extends a strap 60 with a U-shaped cross section that is open rearwardly (to the right in FIGS. 3 and 4) and that encloses a horizontal retainer configured as a rod 62 that is attached to the underside of the housing 34. In place of such a strap 60, which assures a secure connection of the conveyor arrangement 38 to the rear section 36''', hooks or eyes of the same cross section could be attached to each side of the conveyor arrangement 38 which can engage the retainer 62 in the same manner. Obviously other connecting means are also possible.

Since the installation of the conveyor arrangement 38 is also possible when no crop processing arrangement 28 is employed, its attachment can use the rod 62 and the pins respectively engaging the bores 58, not to fasten them to the housing 34 of the crop processing arrangement 28, but in corresponding recesses on the frame 12 or the sections 36' or 36'''.

Accordingly, the preceding description reveals that the central section 36" of the duct 36 represents a cutout into which the crop processing arrangement 28 as well as the conveyor arrangement 38 can be inserted. Furthermore the conveyor arrangement 38 can be connected to the underside of the crop processing arrangement 28 and the crop processing arrangement 28 can be shifted vertically in the rails 37 between the processing position and the rest or stored position, specifically without as well as with the conveyor arrangement 38.

The installation or insertion of the conveyor arrangement 38 in the central section 36" is explained in the following on the basis of FIG. 4, while FIGS. 2 and 3 provide supplementary references.

In the operating or working position of the crop processing arrangement 28, that is, when it is located in the central section 36", it projects with one part of the housing 34 and the lower roll 30 downward beyond the duct 36 and is connected through the drive element 32 to the drive for the blower 24. The crop processing arrangement 28 is retained in each of its positions on the rails 37, in a manner not shown, by retaining pins or by clamping devices providing friction locking. In the working position of the crop processing arrangement 28, the flap 40 is not installed since the channel 36 is closed on its underside by the housing 34 of the crop processing arrangement 28.

As long as it is not installed separately from the crop processing arrangement 28, the conveyor arrangement 38 is installed by first engaging its U-shaped straps 60 with the rod 62 and pivoting it upwards in clockwise direction about the rod 62 until the bores 58 are in alignment so that a pin or the like can be inserted into these. Subsequently the drive component 32, that is, a belt or a chain, is removed from a pulley or sprocket carried by the shaft of the upper roll 30, after releasing the hydraulic pressure for the actuator 50 of the tensioning pulley 52. The crop processing arrangement 28 is then released from its retainers and moved upward along with the attached conveyor arrangement 38 in the rails 37 by means of a pull rope or chain hoist. Thereby the conveyor arrangement 38 reaches its operating position in the central section 36". The upward movement is stopped when the conveyor arrangement 38 has reached a predetermined position in which it occupies the position shown in FIG. 4. In this position, the conveyor arrangement 38 together with the crop processing arrangement 28 is again secured in place with pins or clamping devices preferably in the rails 37. Subsequently, the drive belt or chain 32 is applied to a pulley or sprocket, not shown, in order to drive the shaft 46 and the tensioning pulley 52 is again applied by pressurizing the actuator 50. Finally, if the flap 40 is used, it is hooked into the joint 42 and pivoted upward in clockwise direction until it is brought into contact with the forward section 36' and is secured there by means of pins or other retaining means. Now the conveyor arrangement 38 is ready for operation and can accept the crop, particularly grass, from the chopper assembly 22 and conduct it to the conveyor 24.

According to a further embodiment the flap 40 can also be connected to the forward section 36' rigidly or in particular by a toggle lever as a joint and installed or removed together, which makes possible an even better access, depending on the application, for example, for trimming sieves downstream of the chopper assembly 22.

We claim:

1. In a forage harvester including a chopper assembly and a discharge assembly connected to each other by a duct, and a crop processing arrangement and a conveyor arrangement being provided for alternate installation in said duct in respective working positions wherein they engage crop flowing through said duct from said chopper assembly to said discharge assembly, the improvement comprising: said duct having a cutout for respectively receiving one or the other of said crop processing arrangement and said conveyor arrangement in said respective working positions; and said crop processing arrangement and conveyor arrangement each including respective walls which cooperate to form a section of said duct spanning said cutout when the crop processing and conveyor arrangements are in their respective working positions.

2. The forage harvester defined in claim 1, and further including an identical drive for driving each of said crop processing arrangement or said conveyor arrangement; said discharge assembly including a blower having a rotatably mounted first shaft; said processing arrangement and said conveyor arrangement respectively including rotatably mounted second and third shafts which extend parallel to said first shaft when the processing arrangement or conveyor arrangement are located in their respective working positions; said identical drive including a first drive element mounted for rotation with said first shaft, second and third drive elements respectively mounted for rotation with said second and third shafts, an endless flexible drive element extending between said first drive element and one or the other of said second and third drive elements, and an idler assembly including an idler element biased into engagement with said endless flexible drive element.

3. The forage harvester defined in claim 1 and further including connecting structure securing said conveyor arrangement and said crop processing arrangement together; and mounting structure movably mounting said conveyor arrangement and crop processing arrangement for being selectively moved between a first position wherein said conveyor arrangement is disposed in its working position, with the crop processing arrangement then being in a stored position, and a second position wherein said crop processing arrangement is disposed in its working position, with the conveyor arrangement then being in a stored position.

4. The forage harvester defined in claim 1 wherein said conveyor arrangement includes a conveyor roll having at least two generally radial paddles.

5. The forage harvester defined in claim 1, and further including a flap mounted for closing at least a portion of said cutout of said duct when the conveyor arrangement is installed in its working position.

6. The forage harvester defined in claim 1 wherein said conveyor arrangement includes opposite side walls joined by a sheet metal cover and a bottom plate that connect on inlet and outlet sides of said cutout of said duct.

7. The forage harvester defined in claim 1 wherein said connecting structure includes quick-release devices for securing said conveying arrangement to said crop processing arrangement.

8. The forage harvester defined in claim 7 wherein said quick release devices include a U-shaped strap mounted on said conveyor arrangement and engaged with a retaining rod mounted on the crop processing arrangement.

9. The forage harvester defined in claim 1 and further including a support structure for said crop processing arrangement; said support structure including a pair of guide rails extending transversely relative to the flow of crop through said duct; and said crop processing arrangement including rollers received in said guide rails and movable therealong during movement of said crop processing arrangement between said working position and a stored position.

10. The forage harvester defined in claim 1 wherein said conveyor arrangement includes a pair of side walls, a paddle-carrying shaft mounted for rotating freely in said side walls, and a sheet metal cover and a bottom extending between and joining said side walls, so that the side walls, the sheet metal cover, and the bottom plate form a section of said duct, spanning said cutout, through which crop can be conveyed.

* * * * *